United States Patent
Beliveau et al.

(10) Patent No.: US 10,225,199 B2
(45) Date of Patent: Mar. 5, 2019

(54) ETHERNET CONGESTION CONTROL AND PREVENTION

(71) Applicant: TELEFONAKTIEBOLAGET LM ERICSSON (PUBL), Stockholm (SE)

(72) Inventors: Andre Beliveau, Laval (CA); Brian Alleyne, Los Gatos, CA (US); Mahmoud Mohamed Bahnasy, Lasalle (CA); Bochra Boughzala, Montreal (CA); Chakravarthy Padala, Bangalore (IN); Halima Elbiaze, Pierrefonds (CA); Karim Idoudi, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/550,176

(22) PCT Filed: Feb. 11, 2016

(86) PCT No.: PCT/IB2016/050738
§ 371 (c)(1),
(2) Date: Aug. 10, 2017

(87) PCT Pub. No.: WO2016/128931
PCT Pub. Date: Aug. 18, 2016

(65) Prior Publication Data
US 2018/0034740 A1    Feb. 1, 2018

Related U.S. Application Data

(60) Provisional application No. 62/222,612, filed on Sep. 23, 2015, provisional application No. 62/196,722, (Continued)

(51) Int. Cl.
*H04L 12/26* (2006.01)
*H04L 12/801* (2013.01)
(Continued)

(52) U.S. Cl.
CPC ............ *H04L 47/25* (2013.01); *H04L 41/147* (2013.01); *H04L 43/0852* (2013.01);
(Continued)

(58) Field of Classification Search
CPC ..... H04L 47/25; H04L 47/28; H04L 43/0852; H04L 43/0882; H04L 43/10; H04L 47/11
See application file for complete search history.

(56) References Cited

U.S. PATENT DOCUMENTS 5,313,454 A * 5/1994 Bustini ............... H04L 12/5602
370/231
8,422,367 B2 * 4/2013 Chen ..................... H04L 47/10
370/229
(Continued)

OTHER PUBLICATIONS

International Search Report for PCT/IB2016/050738, dated May 6, 2016, 4 pages.
(Continued)

*Primary Examiner* — Ahmed Elallam
(74) *Attorney, Agent, or Firm* — Ericsson Inc.

(57) ABSTRACT

Switch fabric in routers require tight characteristics in term of packet loss, fairness in bandwidth allocation and low latency for high-priority traffic. Such attributes have been resolved using specialized switch devices, but with the emergence of Data Center Bridging, the possibility of using commodity Ethernet switches to build switch fabric in routers is considered. Systems and methods are provided for adjusting a data transmission rate in accordance with an estimation of network path utilization.

25 Claims, 12 Drawing Sheets

Related U.S. Application Data filed on Jul. 24, 2015, provisional application No. 62/114,728, filed on Feb. 11, 2015.

(51) Int. Cl.
*H04L 12/841* (2013.01)
*H04L 12/825* (2013.01)
*H04L 12/24* (2006.01)

(52) U.S. Cl.
CPC .......... *H04L 43/0882* (2013.01); *H04L 43/10* (2013.01); *H04L 47/11* (2013.01); *H04L 47/28* (2013.01)

(56) References Cited

U.S. PATENT DOCUMENTS

| | | | | |
|---|---|---|---|---|
| 9,049,271 B1* | 6/2015 | Hobbs | ................ | H04L 47/25 |
| 9,088,510 B2* | 7/2015 | Li | ................ | H04L 47/25 |
| 9,215,157 B2* | 12/2015 | Qian | ................ | H04L 43/0829 |
| 9,544,233 B2* | 1/2017 | Ansari | ................ | H04L 12/18 |
| 10,003,473 B2* | 6/2018 | Vasseur | ................ | H04L 12/4641 |
| 2009/0164657 A1* | 6/2009 | Li | ................ | H04L 41/0896 709/233 |
| 2011/0205889 A1* | 8/2011 | Chen | ................ | H04L 47/10 370/230 |
| 2015/0334030 A1* | 11/2015 | Vasseur | ................ | H04L 47/115 370/230 |
| 2017/0187641 A1* | 6/2017 | Lundqvist | ................ | H04L 47/621 |
| 2017/0317937 A1* | 11/2017 | Dillon | ................ | H04L 43/10 |

OTHER PUBLICATIONS

Masahiro Satou et al.: "Server side networking for cloud data centers", 2012 IEEE 1st. International Conference on, IEEE, Nov. 28, 2012, XP032345976, pp. 17-22.

* cited by examiner

ETHERNET CONGESTION CONTROL AND PREVENTION

CROSS REFERENCE TO RELATED APPLICATIONS

This application claims the benefit of priority to previously filed U.S. Provisional Patent Application No. 62/114,728 entitled "ETHERNET CONGESTION CONTROL AND PREVENTION" filed on Feb. 11, 2015, U.S. Provisional Patent Application No. 62/196,722 entitled "ETHERNET CONGESTION CONTROL AND PREVENTION" filed on Jul. 24, 2015, and U.S. Provisional Patent Application No. 62/222,612 entitled "ETHERNET CONGESTION CONTROL AND PREVENTION" filed on Sep. 23, 2015, the contents of which are incorporated herein by reference.

TECHNICAL FIELD

This disclosure relates generally to systems and methods for estimating link utilization and modifying transmission rates to avoid network congestion.

BACKGROUND

Conventional router fabric designs use proprietary switch application-specific integrated circuit (ASIC) devices to provide their required characteristics. As these devices are typically designed for a closed environment, there has not been any standardization for such chip designs, and therefore they can be very expensive. These chips can also have some limited scalability. Building routers spanning more than a single chassis with these conventional ASICs has proven to be difficult and expensive.

Today's router fabric uses these specialized chips to provide characteristics such as guaranteed packet delivery across the fabric, low delay, consistent jitter, maximized bandwidth capacity, etc.

The rise of Data Center (DC) networks and Software-Defined Networking (SDN) require high quality, security, reliability and stability, especially as it concerns network convergence in case of congestion. Fiber Channel (FC) becomes the de facto storage protocol standard for implementing Storage Area Networks (SANs) in data centers. Yet the extension of storage protocol standard Small Computer System Interface (SCSI) over network (Internet Small Computer System Interface (iSCSI)) is in use. These technologies are very sensitive to frame loss. Several other applications have recently arisen that are very sensitive to network latency for example, high-frequency trading, high-performance computing, and RAM-Cloud.

When moving routers into the cloud/DC environment, one is faced with the challenge that the traditional monolithic, single chassis routers are not as suitable in a DC environment. Conventional router functions, such as the route processing and service cards can be mapped to a virtual network function (VNF) running in server blade(s). To retain the same capabilities as a monolithic router provided to those applications, the capabilities that the router fabric provided also need to be provided in the DC environment.

Due to the widespread use of Ethernet, it has become the primary network protocol that is considered to support both DC networking and SDN. Ethernet was originally designed as a best-effort communication protocol and it does not support frame delivery guarantee.

While it may be possible to bring specialized chips into a DC environment, the higher cost and their co-habitation with Ethernet pose potential problems. Using Ethernet can lower the cost and seamlessly integrate with the rest of the DC fabric. It would be desirable to provide the characteristics of a conventional router fabric using standard Ethernet technology.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for estimating congestion associated with a network path between a sending node and a receiving node. The method can be performed by a network node such as the receiving node. The method includes receiving a plurality of packets from the sending node. For each packet in the plurality, a delay experienced by the packet is calculated in accordance with a sending time of the packet and a reception time of the packet. A minimum delay experienced by at least one packet in the plurality is determined. The number of packets in the plurality that experienced a delay greater than the minimum delay is counted. A current congestion factor associated with the network path is determined in accordance with the counted number of packets that experienced delay greater than the minimum delay. A rate adjustment indicator is determined based at least in part on the current congestion factor. The rate adjustment indicator can be sent to the sending node.

In another aspect of the present invention, there is provided a network node comprising circuitry including a processor and a memory. The memory contains instructions executable by the processor whereby the network node is operative to estimate congestion associated with a network path. The network node receives a plurality of packets from a sending node. The network node is operative to calculate, for each packet in the plurality, a delay experienced by the packet in accordance with a sending time of the packet and a reception time of the packet. A minimum delay experienced by at least one packet in the plurality can be determined, and a number of packets in the plurality that experienced a delay greater than the minimum delay can be counted. The network node is operative to determine a current congestion factor associated with a network path in accordance with the number of packets that experienced delay greater than the minimum delay. The network node is operative to determine a rate adjustment indicator based at least in part on the current congestion factor, and to send the rate adjustment indicator to the sending node.

In another aspect of the present invention, there is provided a network node comprising a packet receiving module, a link estimation module and a rate controlling module. The packet receiving module is configured for receiving a plurality of packets from a sending node. The link estimation module is configured for calculating, for each packet in the plurality, a delay experienced by the packet in accordance with a sending time of the packet and a reception time of the packet, for determining a minimum delay experienced by at least one packet in the plurality, for counting a number of packets in the plurality that experienced a delay greater than the minimum delay, and for determining a current congestion factor associated with a network path in accordance with the number of packets that experienced delay greater than the minimum delay. The rate controlling module is configured for determining a rate adjustment indicator based at least in part on the current congestion factor, and for sending the rate adjustment indicator to the sending node.

The various aspects and embodiments described herein can be combined alternatively, optionally and/or in addition to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
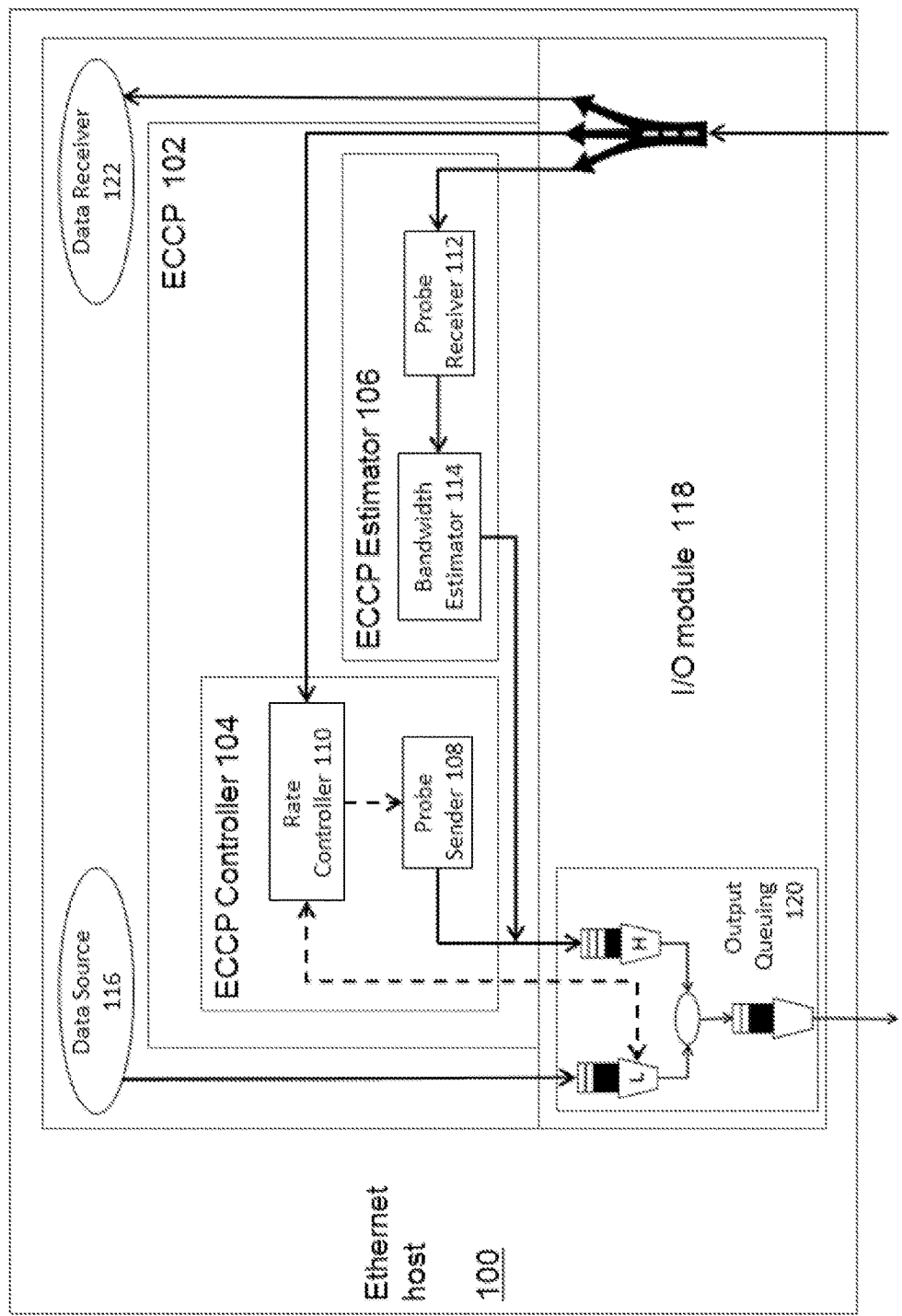
FIG. 1 illustrates an ECCP Ethernet host.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Prior implementations of Data Center (DC) fabric using Ethernet as the key technology have resulted in a number of issues. Ethernet PAUSE (IEEE 802.3x) was issued to solve the congestion problem by sending a PAUSE request to the sender when the receiver buffer reaches a specified threshold. The sender stops sending any new frames until the receiver sends notification that it has enough buffer space. Some data flows are very sensitive to frame loss such as Fibre Chanel over Ethernet (FCoE) and Internet Small Computer System Interface (iSCSI), others depend on higher layer traffic control. Therefore operating on the entire link is a disadvantage of Ethernet PAUSE.

Priority-based Flow Control (PFC) (IEEE 802.1Qbb) was introduced to address this issue by enabling the operator to discriminate flows and select which flow is to be controlled. PFC divides the flow into eight classes (IEEE 802.1p) and discriminates the traffic based on these classes. PFC reduces flow indiscrimination but it is still limited when it comes to Head of Line Blocking (HOL) blocking. To ensure the maximum performance of PFC, all devices have to support it and strict buffer and timing requirements must be applied.

Quantized Congestion Notification (QCN) is part of the IEEE Data Center Bridging (DCB) standard proposal aimed at enhancing existing IEEE 802.1 bridge specifications to satisfy the requirements for I/O consolidation. The goal of QCN is provide end-to-end congestion notification for Layer 2 networks. For QCN to be effective, it must be enabled on the entire data path of the network. When a large number of nodes or flows are connected in a QCN network, the QCN congestion control algorithm causes higher buffer usage and packet lost. QCN is also "unfair", as the switch selects—at random—a received packet, and the source of that random packet will be rate controlled. As such, QCN cannot be considered scalable. QCN also uses the switch buffer length as a method to measure the current network load. Unfortunately, using this method implies that congestion has already occurred.

Other methods to measure a current network load along a path have been proposed. U.S. Pat. No. 8,503,320, the contents of which are incorporated herein, describes systems and methods for determining end-to-end available bandwidth of a path in a packet-switched communication network. In practice, such mechanisms have limited capability to provide an accurate bandwidth estimate when very little bandwidth is available (i.e. when the network is getting close to full capacity). Furthermore, these mechanisms were developed assuming that a single probing host would be used. In the situation where a large number of network paths are probed at the same time, it is evident that these mechanisms do not scale with the number of hosts. The resulting bandwidth estimates can be grossly underestimated.

Embodiments of the present disclosure are directed toward addressing limitations of the conventional congestion measurement and mitigation techniques. Some embodiments include continuously sending probe traffic along network paths to obtain bandwidth estimations. Using these estimates, it can be determined if the network is close to congestion and should start applying rate control (e.g. limit the transmission rate).

Other embodiments of the present disclosure include sending probe traffic along network paths to obtain link utilization estimates. Further embodiments include recording the sending time and the receiving time associated with data packets to obtain link utilization estimations. The sending rate can be adjusted in accordance with the estimated link utilization.

The Ethernet Congestion Control and Prevention (ECCP) system described herein comprises adding a controlled loop system on Ethernet. ECCP continuously probes the status of the Ethernet network to estimate the available bandwidth available on a network path between two end-points. This estimate is then used in the controlled part of ECCP to regulate the amount of traffic allowed to be transmitted toward the other end-host. As the amount of available bandwidth gets close to zero, the outgoing traffic is further constrained in order to prevent congestion and dropped packets in the network.

Some embodiments of the present disclosure do not require any modification from Ethernet bridges, only the end-hosts.

Some embodiments of the present disclosure will be described as only involving the source and destination end-nodes. It will be appreciated by those skilled in the art that the switches and/or intermediate nodes between the end-hosts can also be involved in the probing and/or bandwidth estimation mechanisms. For example, a switch can add congestion or link utilization information along a network path.

To guarantee scalability and alleviate congestion, an upper limit can be defined (e.g. an operating point below 100% utilization) at which it is desired for the system to stabilize. By defining such threshold, the system can maintain the link usage below this threshold and start regulating the sending rates whenever this threshold is reached. The ECCP system does not try to estimate how much bandwidth is available before reaching 100% availability (link capacity). Instead, ECCP estimates how much bandwidth is available within a window that is sized equal to a given percentage of the current sending rate.

Embodiments of the present disclosure are directed to preventing congestion in Ethernet network while achieving maximum throughput and minimum latency by keeping the queues of Ethernet switches empty. In order to keep the switches queue length close to zero, some embodiments include controlling a host's transmission rate rather than controlling the queue length.

In order to prevent frame queuing, ECCP is configured to maintain this minimal available bandwidth margin just before the congestion point. As an example, the system can be configured to guarantee that at least (5%) of the link capacity is always available. This margin, which will be referred to as the Availability Threshold (AvT) can be used as a "safety margin". While this may not improve the overall link utilization, it can improve the network latency as a switch's queues will be almost empty, which can reduce the network latency to the minimum value. In addition, the network will not experience head-of-line (HOL) blocking.

The various ECCP mechanisms described herein use an end-to-end available bandwidth estimation and/or link utilization estimation technique. This information can be used to adjust the host transmission rate accordingly. This process can be distributed on hosts and does not require Ethernet switch modification.

FIG. 1 is a block diagram illustrating an Ethernet host 100, as implemented in a single node. Each end-host connected to an Ethernet switched network can implement the ECCP mechanism 102. ECCP 102 consists of two major components: an ECCP Controller 104 and an ECCP Estimator 106. The ECCP Controller 104 is configured to periodically send a series (e.g. a train) of probe messages towards each remote destination where data traffic is being transmitted. The ECCP Controller 104 comprises a probe sender module 108 and a rate controller module 110. The ECCP Estimator 106 collects the probe information, calculates an estimation of the available bandwidth based on those probes, and returns the bandwidth estimate to the ECCP Controller 104. The ECCP Estimator 106 comprises a probe receiver module 112 and a bandwidth estimator module 114. The ECCP Controller 104 can then determine if it needs to adjust (e.g. limit) the rate of transmission of the data source 116. If enough bandwidth is available, the data transmission rate can be increased. If the bandwidth estimate is below an acceptable threshold, the data transmission rate will be reduced. The adjustment can be made proportional to the severity of the situation. For example, if the available bandwidth is close to zero, the rate will be reduced more than if the available bandwidth is close to the minimal limit.

The input/output module 118 includes an output queuing module 120 for combining the data traffic to be transmitted, from data source 116, and the probe traffic from ECCP Controller 104. Output block 120 can further include one or more rate limiters for controlling the sending rate of the data and/or probe traffic. Similarly, on the input side, the received traffic can be divided into data traffic destined for the data receiver 122, probe traffic for the probe receiver 112, and/or rate control information for the ECCP Controller 104. It will be appreciated that in the embodiment of FIG. 1, the ECCP components and sub-component are shown as implemented in a single node 100.

Figure 2:
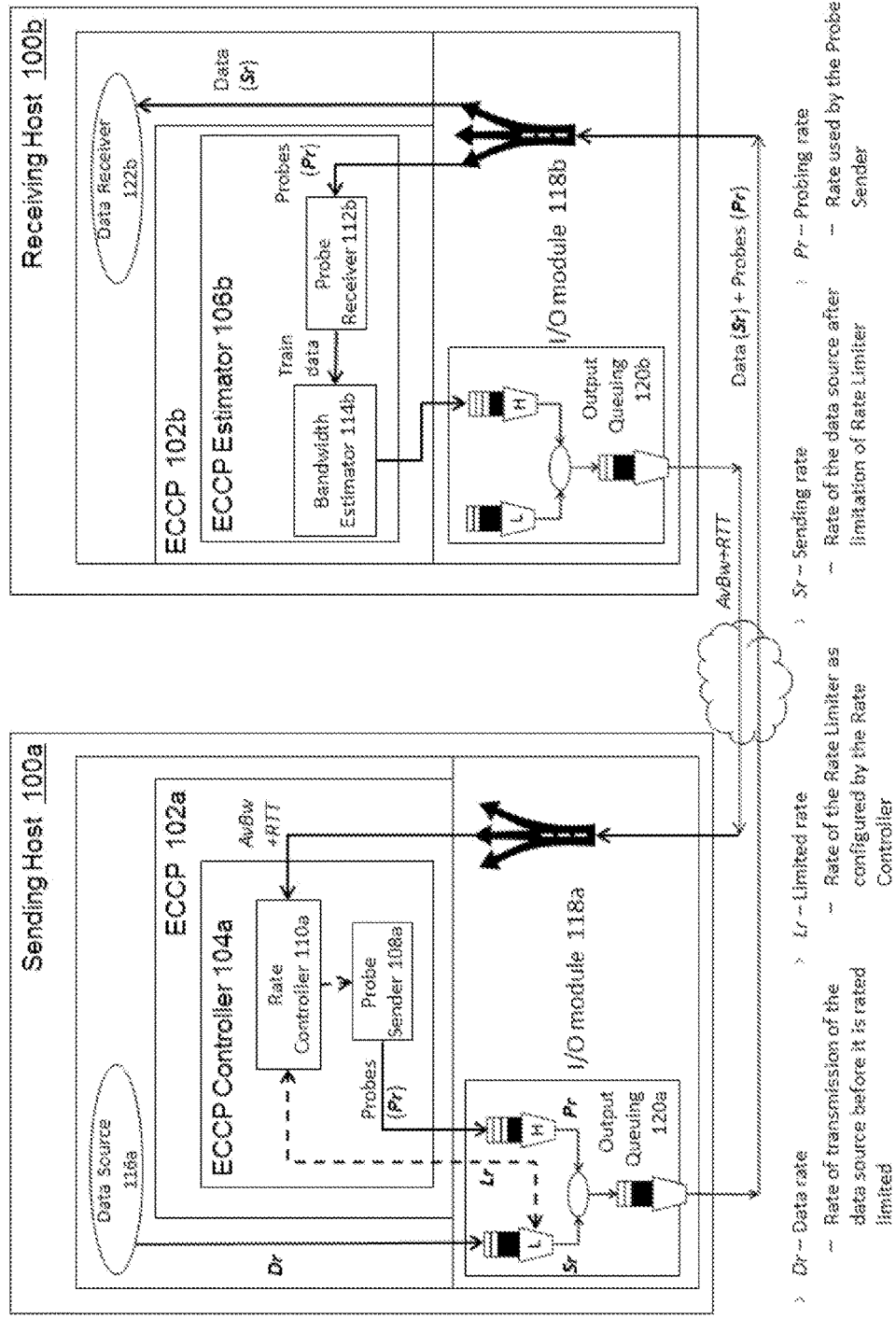
FIG. 2 illustrates an ECCP Ethernet host pair.

FIG. 2 is a block diagram illustrating an ECCP Ethernet host pair 100a and 100b. The embodiment of FIG. 2 includes the same components as FIG. 1, as they would be implemented by two different nodes, Sending Host 100a and Receiving Host 100b, interacting in a network. The ECCP Controller 104a is used by the sending host 100a to generate probes and adjust the transmitting rate. The ECCP Estimator 106b is used by the receiving host 100b to collect the probes (e.g. as a train) and perform an estimation of the bandwidth available between the two hosts 100a and 100b.

In FIG. 2, Dr indicates the "Data rate" which is the rate of transmission of the data source 116a prior to having any rate limiting applied to it. Lr represents the "Limited rate" which is the rate of the rate limiter in block 120a as configured by the Rate Controller 110a. Sr represents the "Sending rate" which is the rate of the transmission of the data source 116a after limitation of the Rate Controller 110a has been applied. Pr represents the "Probing rate" which is the rate of transmission used by the probe sender 108a.

It will be appreciated that FIG. 2 shows only the ECCP Controller 104a portion of the sending host 100a and the ECCP Estimator 106b portion of the receiving host 100b for illustrative purposes of the interaction between the sub-components of the ECCP system. The sending host 100a ECCP estimator and the receiving host 100b ECCP controller are not shown as they are not active in this embodiment.

FIG. 2 illustrates an exemplary scenario where the (left) sending host 100a starts sending data to the (right) receiving host 100b. In this scenario, the sending host 100a ECCP probe sender module 108a starts by sending time stamped probe frames within data toward the output port 120a. The probe rate Pr can be randomized within a maximum limit equal to AvT×Sr. The rate limiter limits the data transmission rate to Lr. The input/output module 120a merges the data and probe frames and sends them out through the network.

Once the receiving host 100b receives the frames, I/O module 118b can differentiate them into three types: data, probe, or estimation. The receiving host 100b sends probe frames into probe receiver module 112b. The probe receiver module 112b can read the time stamp for each frame and add the reception timestamp; this information is then forwarded to the bandwidth estimator module 114b. The bandwidth estimator 114b calculates the Available Bandwidth (AvBw). After that, it sends the AvBw estimation encapsulated in an estimation frame towards the sending host 100a. Once the sending host 100a receives the estimation frame, it can update the rate controller module 110a. According to the available bandwidth estimation AvBw, the rate controller module 110a can determine the maximum limit of the host sending rate (e.g. the Limited Rate Lr). It can then update the rate limiter in the input/output block 118a with the new Lr to control the data transmission rate.

In some embodiments, the ECCP probe sender 108a uses a modified model of the network path (end-to-end) as concatenated hops to estimate the available bandwidth. Each hop consists of an input queue and a transmission link. In the network, each queue has First-Come First-Served (FCFS) service policy (i.e. First-In First-Out (FIFO) queues). Each link j has a constant capacity $C_j$ and a time-varying cross traffic $X_j$. Considering a single congestion link with maximum capacity C and cross traffic X, the available link bandwidth is B=(C−X).

Based on this model, ECCP sending host 100a can send sequences of N probe frame pairs with the same inter-frame interval and a probe rate of Pr. The rate Pr can be randomized for each new sequence. The accuracy of the estimate can improve as N is increased. As discussed, in some embodiments ECCP is not used to measure the exact available bandwidth but, in contrast, to estimate how much bandwidth is available within a window (AvT×Sr) above the current sending rate (Sr). In order to perform this verification, the maximum randomized probe rate is limited to (AvT×Sr). The minimum value for the probing rate can be adjusted as required. The ECCP probe sender 108a timestamps the probe frames while sending.

The ECCP Estimator 106b can include two modules, the probe receiver 112b and the bandwidth estimator 114b. The probe receiver 112b reads the time stamp for each frame and adds a receiving time stamp, then sends this information to the bandwidth estimator module 114b.

In prior bandwidth estimation techniques, such as U.S. Pat. No. 8,503,320, a train of timestamp probes of different rates is sent over the network toward a destination. The receiver timestamps those probes and, based on the difference between delays of consecutive probes at different rates, it can estimate the amount of available bandwidth along the path between the probe sender and the probe receiver. This estimation technique can determine how much bandwidth is available between two hosts. To do this estimation, it is required to send probes in the range of zero to maximum link capacity. However, in a network where there are multiple hosts connected to each other, and each host will send probes, probes cannot be sent at the maximum link capacity as it would certainly create congestion and would not scale with the number of hosts.

In embodiments of the present disclosure, such as FIG. 2, a similar probing technique can be employed. However, the estimation attempts to answer a different question than the prior art techniques—what is the amount of bandwidth available within a margin above the current sending rate? The purpose is not to attempt to reach the maximum (e.g. 100%) link utilization by the sources, as that would create congestion. An objective is to guarantee link utilization close to 100% by working within a certain margin close to 100% link utilization. Embodiments of ECCP are configured to maintain a predetermined minimal amount of available bandwidth just before the congestion point. As an example, a performance goal can be set to stay within 5% of the link capacity of a link. If the total link capacity is 10 Gbps, ECCP can be configured to guarantee that at least 500 Mbps (5%) of the link capacity is always available.

This margin is the Availability Threshold (AvT), as discussed, and it can be defined as a percentage independent of the link capacity. This margin can also have a second purpose. This "freed" bandwidth will be used for sending the probe messages. This margin can also be used to determine the limit of the Probe Rate (Pr).

As the maximum value of the probe rate is AvT×Sr, the bandwidth estimator 114b will return a value between 0 and AvT×Sr. If there is AvT×Sr bandwidth available, then it is determined that there at least a certain (threshold) amount of bandwidth available. If there is less than AvT×Sr bandwidth available, then the ECCP mechanism can adjust the rate of the sender to reduce the risk of congestion.

The Rate Controller 110a is another component of ECCP mechanism. Its role includes determining the value of the Limited Rate (Lr) which indicates the maximum output rate for that particular line card. The Rate Controller 110a can use the estimate of the available bandwidth as reported by the Bandwidth Estimator 114b and the sending rate (Sr) to determine if the limit of the Rate Limiter in block 120a should be adjusted. It is configured to determine if a rate limit should be applied to the data source 116a and to set the Rate Limiter in 120a accordingly.

The Limited Rate (Lr) is calculated based on AvBw estimate in a way that guarantees for every packet leaving the ingress line card to make it through the fabric and to reach the egress line card, to provide fairness amongst all the line cards in the network.

The rate controller 110a reads the AvBw estimate that is sent through the network from the bandwidth estimator 114b of the receiving host 100b. The Round Trip Time (RTT) can also be considered. RTT is defined as the time for a packet to be forwarded to a destination and returned back to the source. A set of parameters are defined for the rate control algorithm to determine whether the current value of the limited rate (Lr) should be increased or decreased. Thus, the rate controller 110a calculates these control parameters first, and then it can adjust the new value of the Lr.

Figure 3A:
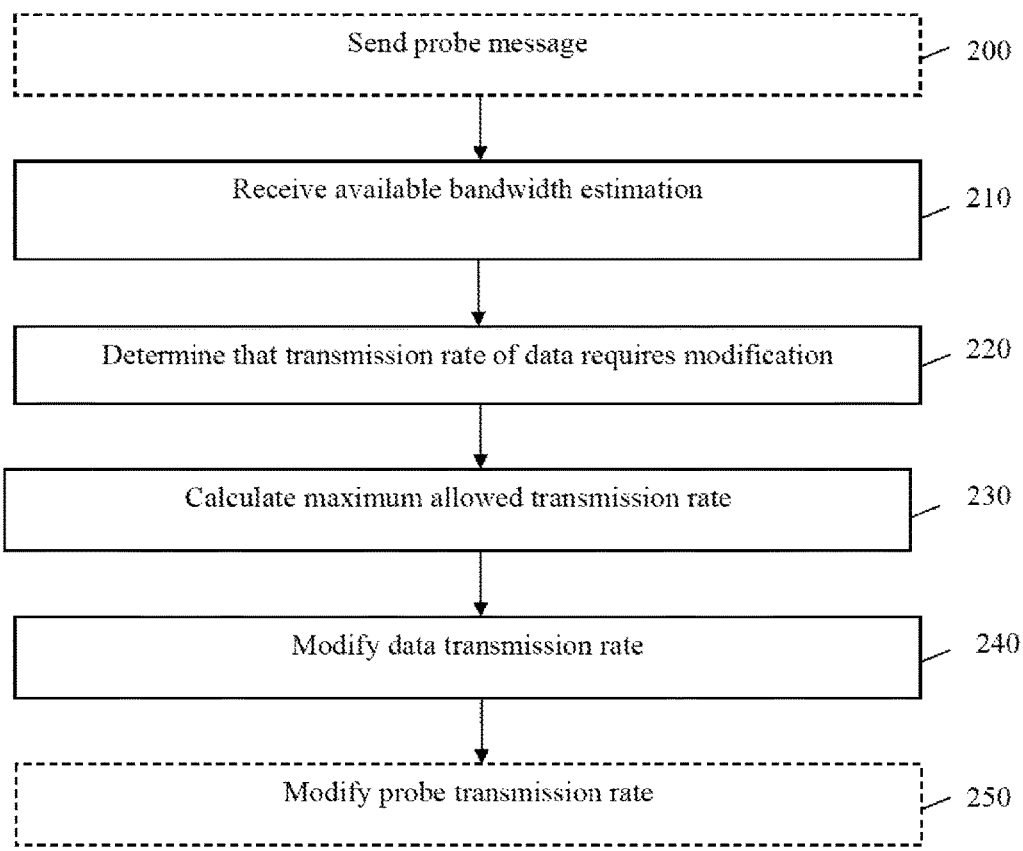
FIG. 3a is a flow chart illustrating a method for adjusting a data transmission rate.

FIG. 3a is a flow chart illustrating a method for adjusting a data transmission rate to prevent network congestion. The method of FIG. 3a can be implemented by an ECCP Controller 104a at a sending node 100a in a communication network. The method begins by optionally sending a probe message to a destination node in the network (block 200). The probe message can be one of a plurality of time-stamped messages sent at a variable rate (e.g. the probe transmission rate).

An available bandwidth estimation is received (block 210). The available bandwidth estimation can indicate an amount of bandwidth that is available along the path between the source node and the destination. It is determined if a modification to the data transmission rate of the sending node 100a is required in accordance with the received available bandwidth estimation (block 220). This determination can be made by comparing the available bandwidth estimation to an availability threshold, which defines a margin of the minimal bandwidth required to be available before reaching the link capacity (e.g. 100% link utilization). The determination can be that the data transmission rate needs to be increased or decreased. The determination can include selecting between initiating a rate increase process or a rate decrease process.

The maximum allowed transmission rate can be calculated based on the received available bandwidth estimation and respecting the availability threshold (block 230). The data transmission rate can then be modified in accordance with the calculated maximum allowed transmission rate (block 240). Optionally, the probe transmission rate can also be modified in accordance with the calculated maximum allowed transmission rate (block 250).

The various systems and methods described herein can be used to adjust the data transmission rate of a node in accordance with the maximum allowed transmission rate.

In some embodiments, different data transmission rate adjustments can be made to different flows (e.g. traffic classes) between the same two end hosts. For example, a first limited rate can be applied to a first type of traffic flow and a second limited rate can be applied to a second type of traffic flow by a sending node. This determination can be made based on classifying, or categorizing, packet traffic in accordance with at least one parameter.

Figure 3B:
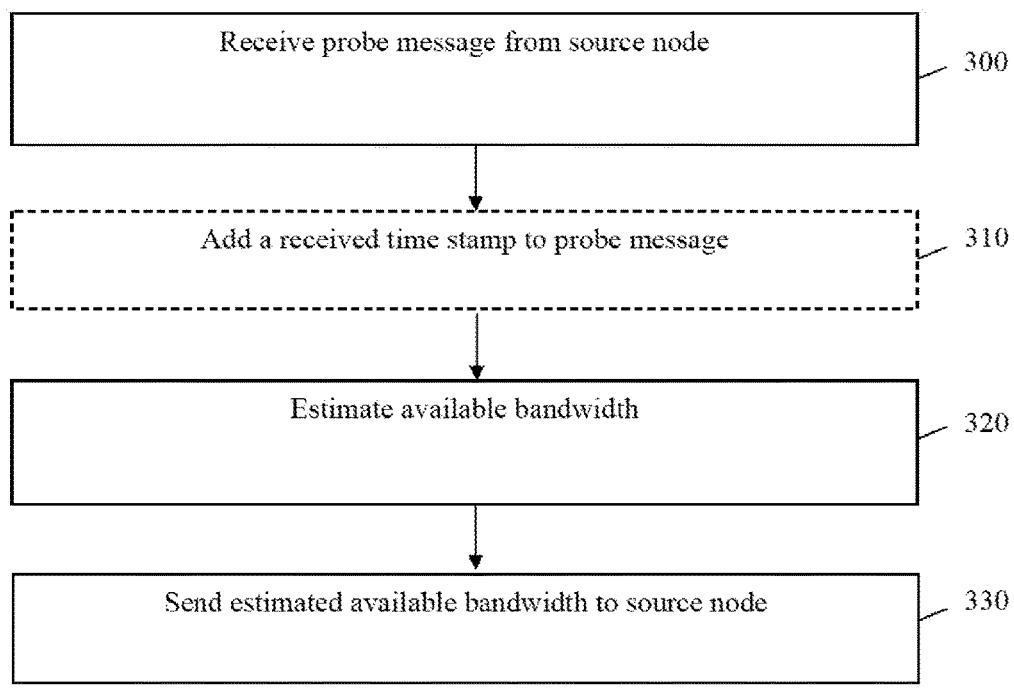
FIG. 3b is a flow chart illustrating a method for estimating available bandwidth.

FIG. 3b is a flow chart illustrating a method for estimating available bandwidth between a source node 100a and a destination node 100b. The method of FIG. 3b can be implemented by an ECCP Estimator 106b at a receiving node 100b in a communication network.

The method begins by receiving a probe message from the source node (block 300). This can include receiving a packet or frame and identifying that it is a probe message. In some embodiments, received messages can be classified as one of data messages, probe messages, or estimation messages.

A sending time-stamp of the probe message can be read and a receiving time-stamp can be added to the probe message (block 310). The available bandwidth between the sending and receiving nodes can be estimated using the time stamp information (block 320). The calculated available bandwidth estimation can then be sent to the source node (block 330).

In the embodiments described above, ECCP can employ a distributed algorithm that runs only on end-hosts 100 without requiring participation of the switch. Each ECCP agent relies on a bandwidth estimator 114 and a rate controller 110. The algorithm has a control cycle that starts with a probe sender 108 that is part of the controller module 104.

The probe traffic can be generated with a rate that is controlled and limited by the amount of the sending rate. The probe packets can carry information such as timestamps, packet identifier and train identifier, and this information can be used by the estimator in order to compute the estimation of the available bandwidth. Gathering this information at the receiving side is the role of the probe receiver. The probe receiver also adds the receiving time for each probe packet before passing the collected probe train to the bandwidth estimator. The estimator uses a computation algorithm similar to bandwidth available on real time methodologies, but instead of trying to have the most accurate available bandwidth estimate, the estimator calculates a feedback value to return to the sender to indicate if there is room to increase its sending rate, using the Additive Increase Multiplicative Decrease (AIMD) principle for example. If the feedback is negative, this means that the system is close to congestion. In that case, the ECCP rate controller can trigger a rate decrease process such as a process similar to the QCN reaction point algorithm.

The ECCP mechanisms described thus far allows for a proactive control on the output rate and does not wait for congestion to occur to react. ECCP helps ensure fairness between all the nodes since they continue probing for the available bandwidth individually while adapting to changes in network conditions. ECCP is also scalable as the probe amount is independent of the number of hosts and flows and it consumes a controlled amount of the overall bandwidth.

Some embodiments of ECCP are based on a self-induced congestion probing model that allows the probes to be generated in a rate higher than the available bandwidth. When the system approaches network congestion, queue length fluctuation can be observed. Such behavior can impact the packet latency and jitter. In order to limit the chance of reaching congestion, ECCP can keep the link utilization below the maximum link capacity by a certain percentage. However, in some cases this safety margin can be considered to be a waste of network bandwidth. The probes generated by the ECCP controller also consume an amount of the bandwidth from the actual network traffic workload. Probe generation can also require processing power that can introduce an overhead in terms of CPU usage.

Figure 4:
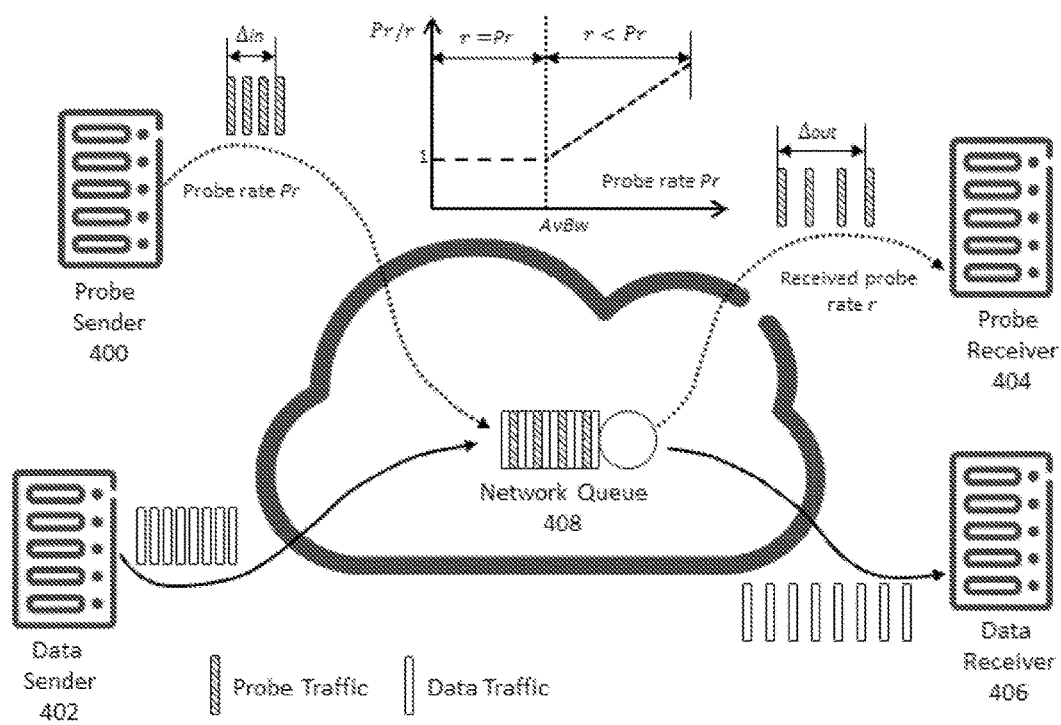
FIG. 4 illustrates an active probing scheme based on self-induced congestion.

As discussed, some embodiments of ECCP use an available bandwidth estimation technique which is based on self-induced congestion. FIG. 4 illustrates an active probing scheme based on self-induced congestion. Probe Sender 400 adds probe traffic to the data sent by Data Sender 402. The probes are received by Probe Receiver 404 and the data by Data. Receiver 406. The concept of self-induced congestion relies on that, if the injected probe rate Pr (as sent by Probe Sender 400) is less than or equal to AvBw, the arrival probe rate r (as received by Probe Receiver 404) matches the probe rate Pr of the sender 400. However, if Pr exceeds AvBw, the probe packets are queued in the network queue 408 and the output probe delay is increased, consequently reducing r (Pr/r>1). Thus, this technique requires sending probes at a rate higher than the available bandwidth in order to estimate AvBw, which might put the path into congestion.

On the other hand, ECCP controls the sending rate using a self-increase process, and a rate decrease process based on negative feedback. Therefore, in some embodiments ECCP does not require an exact estimation of AvBw, it may only require feedback when the link is close to congestion in order to trigger the rate decrease process. Thus, an indication of the increase (or trend) in link utilization may be sufficient for ECCP.

Once the ECCP controller receives AvBw information, it can calculate a feedback value $F_b$ to control the sending rate R according to Additive Increase Multiplicative Decrease principles.

$$R \leftarrow \begin{cases} R(1 - G_d \times |F_b|) & \text{if } F_b < 0 \\ \frac{1}{2}(R + TR) & \text{otherwise} \end{cases} \quad (1)$$

where $G_d$ is a fixed value and is taken in a way that $G_d |F_{max}| = \frac{1}{2}$ and TR is the target rate which is equal to the last sending rate before congestion.

Further variants of ECCP will be considered to address the potential limitations mentioned herein. In some embodiments, a technique called "link utilization estimation" can be used in place of the available bandwidth estimation. Two alternative embodiments, referred to as Short Probe ECCP (SP-ECCP) and No Probe ECCP (NP-ECCP) will be discussed and compared.

In some embodiments, a technique for estimating link utilization using low rate probe traffic (e.g. short probe) can be employed. The end-to-end network path can be modeled as concatenated hops, where each hop consists of an input queue and a transmission link. The utilization of the queue in a single-hop scenario is $U=1-\pi$, where $\pi$ is the probability that the queue is empty.

By sending a low rate probe Pr, the link utilization can be expressed as $U(V)=\min(1, U(0)+Pr/C)$, where C is the capacity of the link and U(0) is the link utilization when the probe rate Pr=0. For the multi-hop case, this equation can be approximated as the following first order equation:

$$U(r) \approx \min(1, aPr+b) \quad (2)$$

where a and b are constants. Equation 2 shows that the relation between the link utilization and the probe rate is linear.

Figure 5:
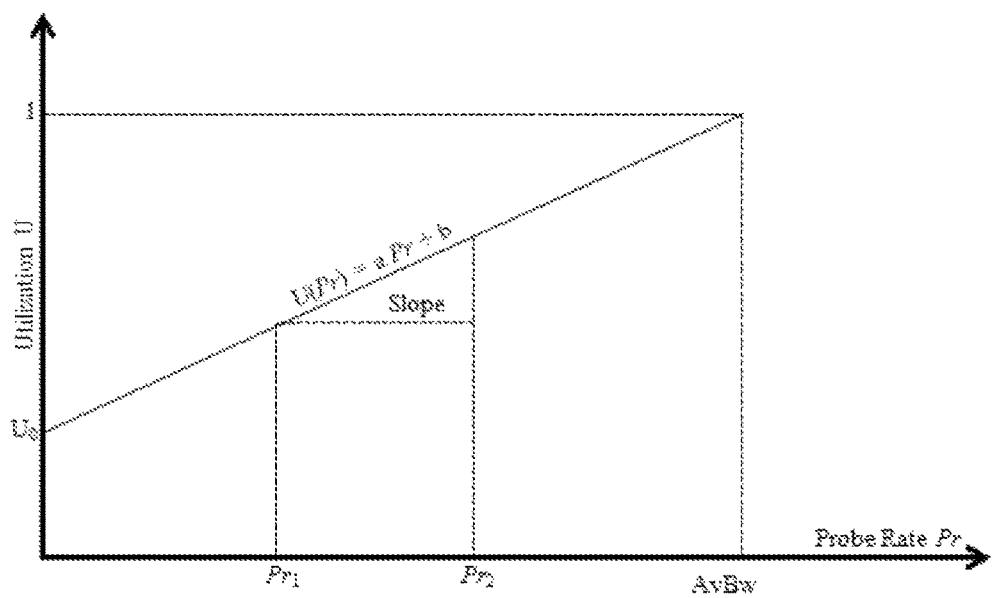
FIG. 5 is a graph illustrating the relationship between link utilization and probe rate.

FIG. 5 is a graph 500 illustrating the relationship between the link utilization U and the probe rate Pr. As shown in graph 500, the relationship is linear and can be represented by the equation U=U(0)+Pr/C, as above, where U(0) is the link utilization when the probe rate Pr=0. By calculating a and b using at least two probe rates, AvBw can be estimated as the probe rate at the point where the link utilization is 1 (e.g. 100%).

$$AvBw = (1-b)/a \qquad (3)$$

The key to solving equations 2 and 3 is to estimate link utilization. A packet train can be sent to compute the fraction of packets that have experienced queuing delay along the path. By time-stamping the probe packets at the sender and the receiver, one can compute the minimum one-way delay of any set of packets $\{p_1, p_2, \ldots, p_N\}$. This minimum delay corresponds to the packet(s) that have not experienced any queuing delay. Thus, the packets that experienced delay greater than the minimum delay are the fraction of packets that suffered queuing delay. Hence the estimated link utilization can be calculated as:

$$\ddot{U} = \frac{\|d_i > \min(D) | d_i \in D\|}{\|D\|} \qquad (4)$$

where $D = \{d_1, d_2 \ldots d_N\}$ is the set of one-way delays experienced by packets $\{p_1, p_2, \ldots, p_N\}$.

The estimated link utilization can be further used to calculate the feedback value $F_b$, which reflects a closer state to congestion, and thus, this feedback value can be used to control the sending rate.

Figure 6:
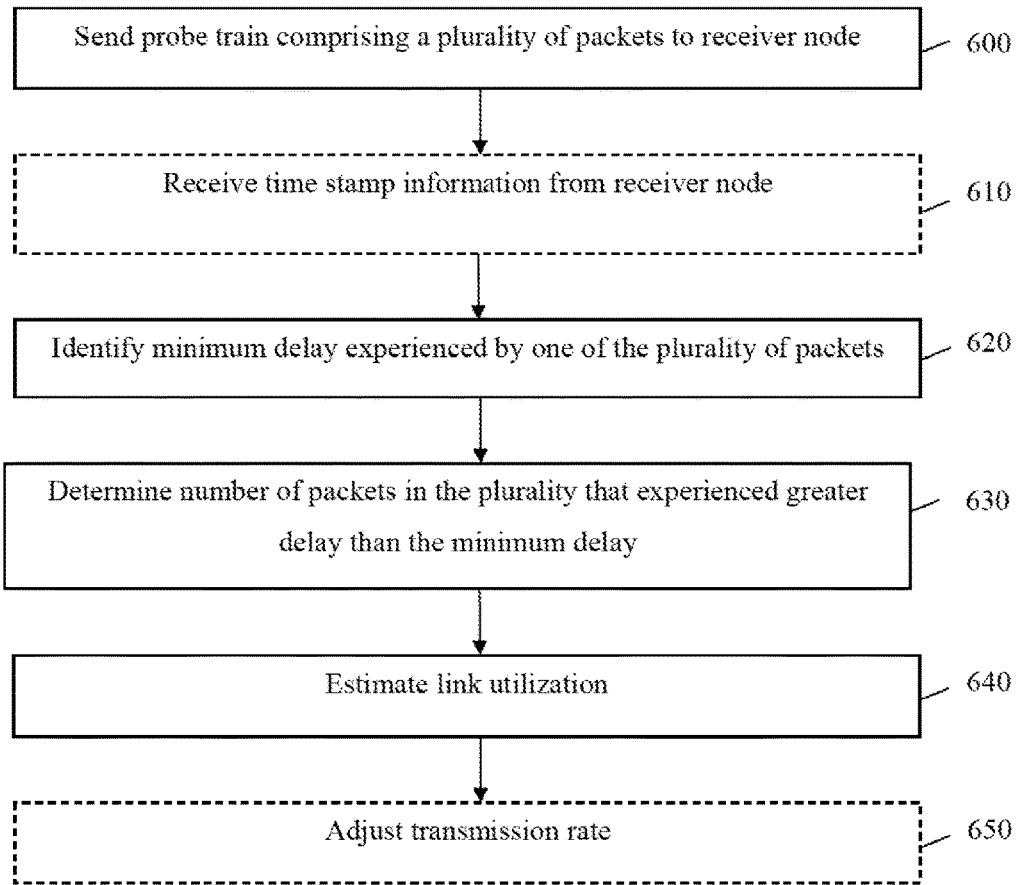
FIG. 6 is a flow chart illustrating a method for adjusting a data transmission rate using a short probe train.

FIG. 6 is a flow chart illustrating a method for adjusting a data transmission rate using a short probe train. The method of FIG. 6 can be implemented by an ECCP Controller such as 104a at a sending node 100a in a communication network. The method begins by sending a probe train to a receiver/destination node in the network (block 600). The probe train can comprise a plurality of time-stamped packets/messages. The packets in the probe train can be time-stamped at receipt by the receiver/destination node. Optionally, the sending node can receive this time stamp information from the receiver node (block 610).

The sending time stamp and the receiving time stamp information can be compared to determine the delay experienced by each packet in the probe train. This comparison can be used to identify the minimum delay experienced by any one or more of the packets in the probe train (block 620). A packet that has experienced only the minimum amount of delay can be considered to have experienced no queuing delay. The step of identifying the minimum delay can optionally be performed by either of the sending node or the receiving node. If performed by the receiving node, the result can be transmitted to the sending node.

The number of packets in the probe train that experienced greater than the minimum delay can then be counted and determined (block 630). A fraction, or percentage, of the packets in the probe train that experienced greater than the minimum delay can also be determined. A packet that has experienced greater than the minimum amount of delay can be considered to have experienced queuing delay. The link utilization (e.g. between the sending node and the receiving node) can be estimated based at least partially on the number of packets in the probe train that have experienced greater than the minimum delay (block 640). The step of estimating link utilization can optionally be performed by either of the sending node or the receiving node. If performed by the receiving node, the result can be transmitted to the sending node. The estimated link utilization can be forwarded to a rate controller mechanism at the sending node to adjust the transmission rate (of the data and/or of the probe train) in accordance with the link utilization estimate (block 650).

It will be appreciated by those skilled in the art that a similar method for adjusting a data transmission rate using a short probe train can be performed by an ECCP Estimator at a receiving node in a communication network. Many of the steps of the method of FIG. 6 can be performed at either the sending node or the receiving node without altering the overall methodology.

Unlike the conventional bandwidth available on real time mechanisms, the link utilization estimation technique discussed above does not require a fixed inter-frame interval. By eliminating this restriction, it is possible to use the data frames themselves as probes. This will be referred to as the NP-ECCP approach. However, the data frames need to be time stamped, which may not be practical to implement at the Ethernet layer (e.g. there may not be an appropriate field in which to add time-stamp information). In order to overcome this issue, the data sender can keep track of the sending time and the Frame Check Sequence (FCS) of the last H packets transmitted. NP-ECCP can use FCS as a frame identifier and H can be taken to be greater than the number of packets that can be sent while waiting for data information acknowledge (H>(C*T/L)), where L is the packet size and T is the time between two acknowledges (H>10*$10^9$*0.5*$10^{-3}$/(1000*8)=625). Alternatively, the pair of FCS and the frame length can be used as the frame identifier as the possibility of having a repeated FCS and frame length within H frames is rare.

The receiver samples the received data based on a byte counter $BC_r$. Note that the sampling is based on a byte counter instead of a timer, which achieves fairness by generating more feedback messages for the high rate flows. Once this counter expires, the receiver sends the receiving time, the FCS and frame length of the last N frames encapsulated in an Ethernet frame to the sender (N is taken to be equal 32 in this example). When the data sender receives this information, it searches in its local information for the sending time of each frame based on the FCS and frame length pair.

Then, the sender can use the link utilization estimate technique to calculate an estimation of the congestion (CE) as the percentage of packets that exceed the minimum delay by simplifying Equation 4.

$$\ddot{CE} = \frac{\text{Count}((d_i - \min(D)) > 0)|d_i \in D}{\text{Count}(D)} \qquad (5)$$

In order to reduce the effect of measurement error and system noise, a certain delay threshold ($D_{th}$) will be considered before counting delayed packets (Equation 6).

$$\ddot{CE} = \frac{\text{Count}((d_i - \min(D)) > D_{th})|d_i \in D}{\text{Count}(D)} \qquad (6)$$

NP-ECCP can be implemented using a similar architecture to ECCP (as shown in FIGS. 1 and 2). In NP-ECCP data is used as the probe, but data frame lengths are not fixed like probe frames. Hence, the frame delay can be normalized to its length and then multiplied by the average frame size (which is can be 1000 Bytes, for example). Thus Equation 6 becomes:

$$\ddot{C}E = \frac{\text{Count}\{(\hat{d}_i - \min(\hat{D})) > D_{th}\}|d_i \in \hat{D}}{\text{Count}(\hat{D})} \quad (7)$$

where $\hat{D}=\{\hat{d}_1, \hat{d}_2 \ldots \hat{d}_N\}$ is the set of normalized one-way delay; $\hat{d}_i=d_i/l_i \times 1000$; and $l_i$ is the length of the $i^{th}$ frame.

Next, the NP-ECCP system can calculate a feedback value $F_b$ to indicate how close the link utilization is to 1 (e.g. how close to 100% capacity) in Equation 8:

$$F_b = -K^*(\underline{CE} + w^*(\underline{CE} - CE_{old})) \quad (8)$$

where $CE_{old}$ is the CE of the last calculated $F_b$, and K is constant and is taken to be equal 32 to keep the $F_b$ values of NP-ECCP within the same range as the initial ECCP.

Finally, it passes this calculated feedback value to the controller in order to execute either a rate increase or rate decrease process (as per Equation 1). For example, if the NP-ECCP rate controller receives a negative $F_b$, it can control the sending rate accordingly. It is noted that the NP-ECCP system does not use probe generation, which can reduce the required computational power and increase the throughput.

Figure 7:
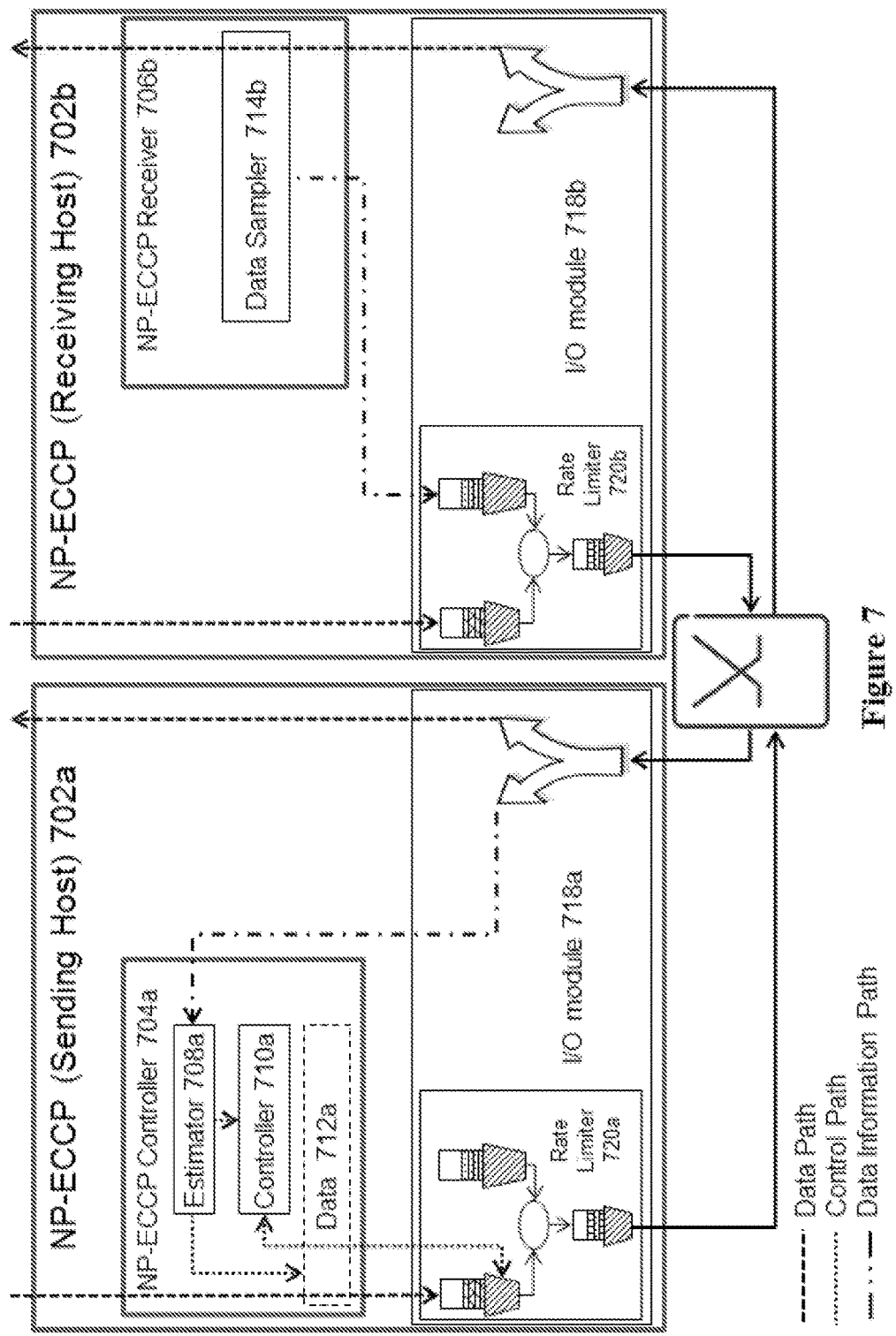
FIG. 7 illustrates an example no probe ECCP architecture.

FIG. 7 illustrates an example NP-ECCP architecture. It will be noted that NP-ECCP does not use probe generator and that the estimator can be modified to forward the $F_b$ information to the local controller instead of sending feedback to the paired line card as was the case in FIG. 1. Similar to the embodiment of FIG. 2, FIG. 7 illustrates an exemplary scenario where the (left) sending host sends data to the (right) receiving host. FIG. 7 shows only the NP-ECCP Controller 704a portion of the sending host NP-ECCP module 702a and the NP-ECCP Receiver 706b portion of the receiving host NP-ECCP module 702b for illustrative purposes of the interaction between the sub-components of the NP-ECCP system. The sending host NP-ECCP Receiver 706a and the receiving host NP-ECCP Controller 704b are not shown as they are not active in this embodiment. Both sending and receiving hosts have I/O modules 718a/718b that include rate limiters 720a/720b.

At the sender side 702a, the NP-ECCP Controller 704a can keep track of information such as the FCS and the sending time of the last H number of packets. In some embodiments, this information can be stored in data storage 712a. In other embodiments, this type of information can be appended to the packet(s) and need not be stored at the sending node 702a. At the receiving side 702b, the NP-ECCP Receiver 706b is configured to sample the data based on a Byte counter. The sampling Byte counter BG is taken in this example to be equal to 30000 Bytes. Note that the sampling is based on Byte counter instead of a timer, which achieves fairness by generating more feedback messages for the high rate flows. Once the counter expires, the data sampler 714b encapsulates the FCS and the receiving time of the last N frames in an Ethernet frame that is sent towards the sending host over the network. When the NP-ECCP estimator 708a receives this information from the receiver 706b, it searches in its data history 712a for information of the last H packets for the sending times of these N frames. Then it can calculate the delay using the sending time from its data history 712a and the receiving time from the information received. Next, the NP-ECCP estimator 708a can estimate the link utilization using the mechanism discussed above and calculate a feedback value $F_b$ (e.g. using Equation 8). Finally, it can forward the calculated $F_b$ to the NP-ECCP rate controller 710a to control the sending rate via rate limiter 720a.

Figure 8A:
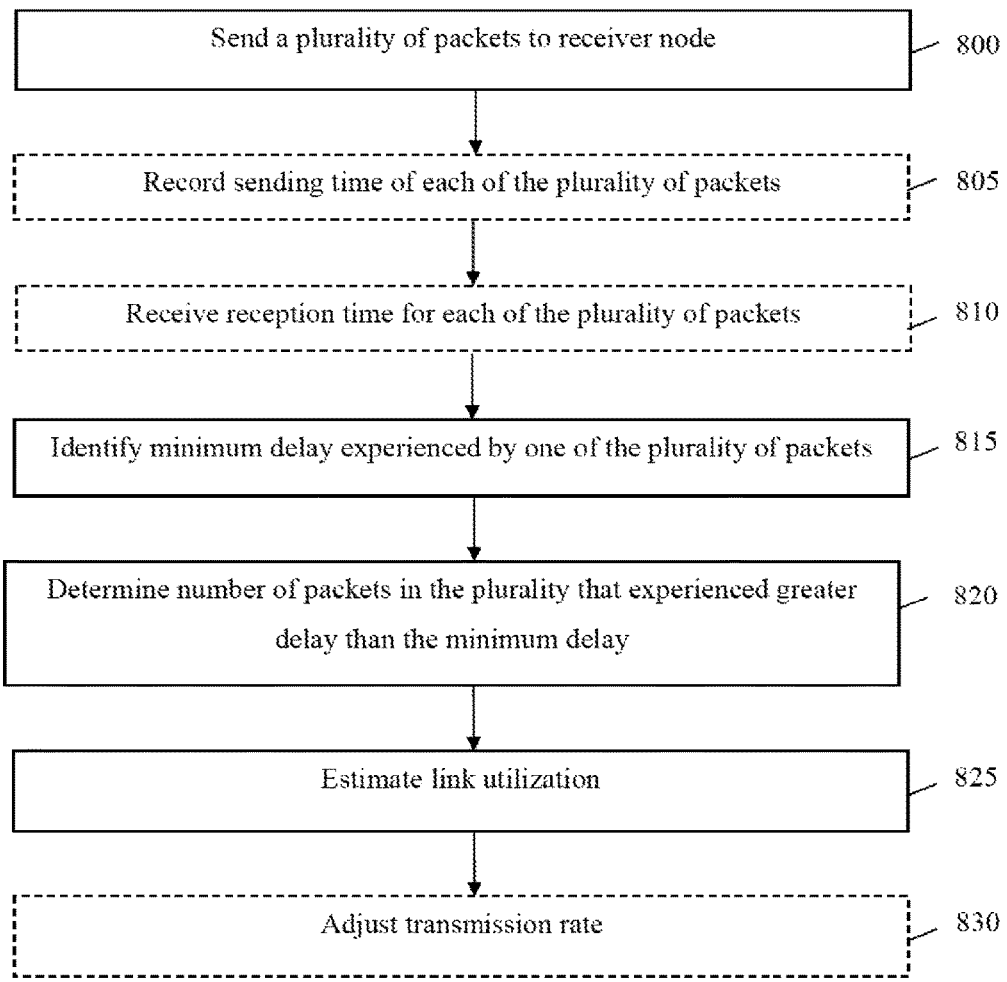
FIG. 8a is a flow chart illustrating a method for estimating link utilization at a sending node.

FIG. 8a is a flow chart illustrating a method for adjusting a data transmission rate. The method of FIG. 8a can be implemented by a controller, such as a NP-ECCP controller, at a sending node in a communication network. The method begins by sending a plurality of packets to a receiver/destination node in the network (block 800). In some embodiments, the packets can be data frames.

The sending time of each of the packets can be recorded and stored by the sending node (block 805) in its data history, for example. The sending time can be recorded along with a frame identifier, such as a frame check sequence. Other examples of a frame identifier include using other fields from the upper layers, such as the Identification field (layer 3) in IPv4, or sequence number (layer 4) in TCP. In some embodiments, the sending time can be stored for a predetermined number of packets in the plurality. The predetermined number of packets can refer to the most recently sent packets.

In an alternative embodiment, the sending time of the packet may not be recorded and stored by the sending node. Optionally, the sending time can be appended to the packet itself as metadata. For example, the metadata can be included as a header extension in IPv6 or an option field in IPv4. In this case, the congestion estimation computation can alternatively be performed at the receiving node, as opposed to the sending node, as all information required is carried by the packet itself and storing of the sending time at the source is no longer required.

In some embodiments, the reception time for the plurality of packets can be recorded and received from the receiving node (block 810).

The sending time information and the receiving time information can be compared to determine the delay experienced by each packet in the plurality. This calculation can be used to identify the minimum delay experienced by any one or more of the packets in the plurality (block 815). A packet that has experienced only the minimum amount of delay can be considered to have experienced no queuing delay. The step of identifying the minimum delay can optionally be performed by either of the sending node or the receiving node. If performed by the receiving node, the result can be transmitted to the sending node.

The number of packets in the plurality that experienced greater than the minimum delay can then be determined (block 820). A percentage of the packets in the plurality that experienced greater than the minimum delay can also be determined. A packet that has experienced greater than the minimum amount of delay can be considered to have experienced queuing delay. The path or link utilization (e.g. between the sending node and the receiving node) can be estimated based at least partially on the number of packets in the plurality that experienced greater than the minimum delay (block 825). The step of estimating link utilization can optionally be performed by either of the sending node or the receiving node. If performed by the receiving node, the result can be transmitted to the sending node. The estimated link utilization can be forwarded to a rate controller mechanism to adjust the transmission rate (of the data and/or the probe train) in accordance with the link utilization estimate (block 830). In some embodiments, the link utilization estimation can be used to calculate a rate adjustment indicator, such as the feedback value discussed herein. The rate adjustment indicator can, in turn, be used to adjust the transmission rate (block 830).

Figure 8B:
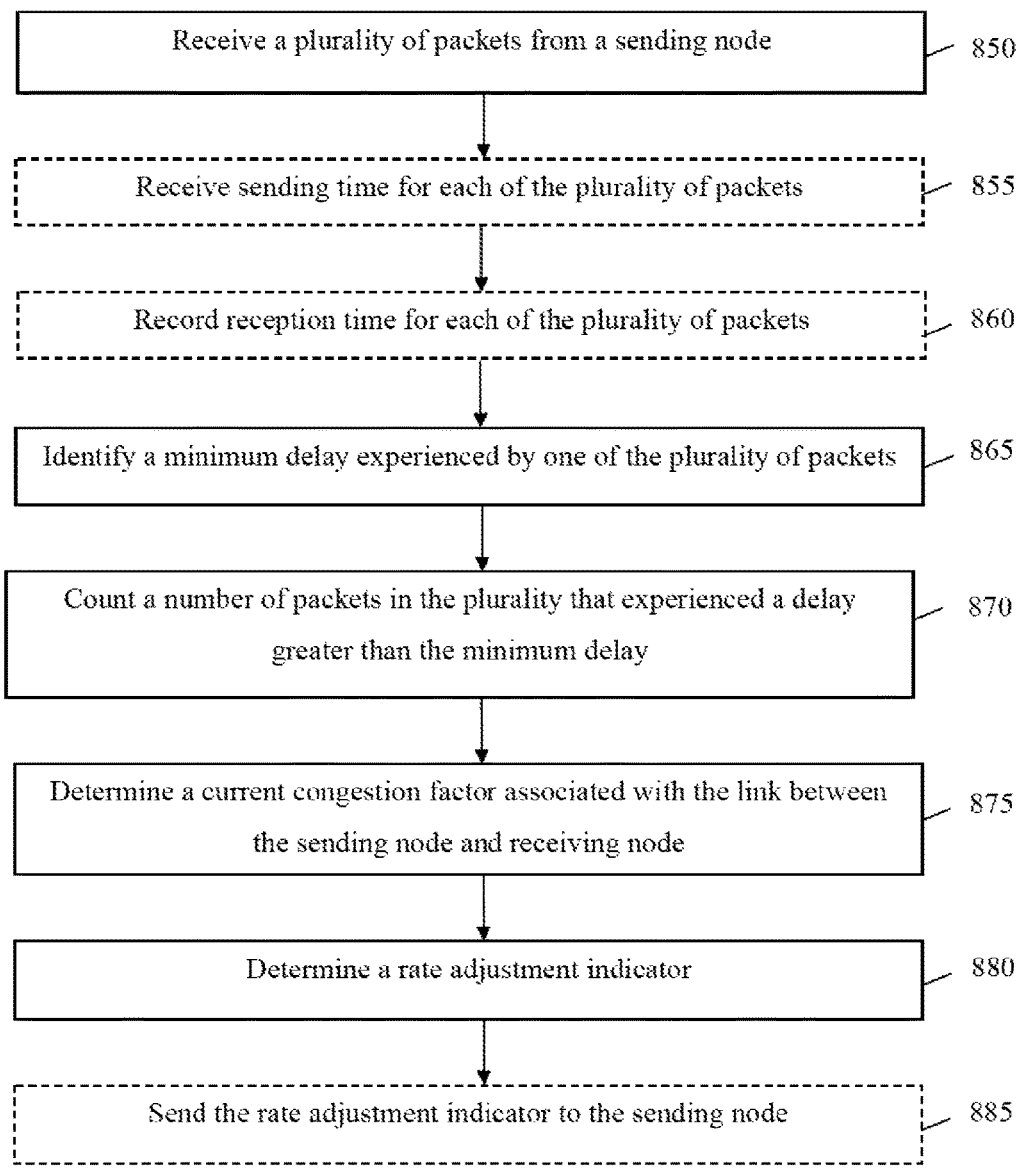
FIG. 8b is a flow chart illustrating a method for estimating congestion at a receiving node.

FIG. 8b is a flow chart illustrating a method for estimating congestion associated with a network path between a sending node and a receiving node. The method of FIG. 8b can be implemented by a receiver, such as a NP-ECCP receiver, at a receiving node in a communication network. A network path can be composed of a set of one or links between the sending and receiving nodes. The method begins by receiving a plurality of packets from a sending node (block 850). In some embodiments, a sending time for each of packets is also received (block 855). The sending time can be included in the packet itself, or can be received via an additional message. Optionally, the reception time for each of the plurality of packets can be recorded by the receiving node (block 860).

The minimum delay experienced by at least one of the plurality of packets is identified (block 865). The delay experienced by each packet can be calculated in accordance with its sending time and reception time. The calculated delays can be compared, and thus, the minimum delay experienced by a packet in the plurality of packets can be identified. A packet that has experienced the minimum delay can be considered a packet that has experienced no delay queuing.

The number of packets in the plurality that experienced a delay greater than the minimum delay is counted (block 870). A packet that has experienced delay greater than the minimum delay can be considered a packet that has experienced delay queuing. In some embodiments, the delay experienced by a packet can be normalized with respect to its packet size. Techniques such as those describe with respect to Equation 7 can be used for normalizing a packet's delay to its length.

A current congestion factor associated with the path between the sending node and the receiving node can be determined (block 875). This determination can be made in accordance with the number of packets that experienced a delay greater than the minimum delay. The current congestion factor can indicate how close the utilization of the path, or link, is to full utilization.

A rate adjustment indicator can be determined based at least in part on the current congestion factor (block 880). In some embodiments, the rate adjustment indicator can be determined based on at least one previously determined congestion factor. The rate adjustment indicator can indicate a trend of the current congestion factor relative to a previous congestion factor.

Optionally, the rate adjustment indicator can be transmitted to the sending node (block 885). The rate adjustment indicator can be sent to the sending node to control a transmission rate of the sending node. The rate adjustment indicator can indicate if the transmission rate of the sending node should be increased or decreased.

Figure 9:
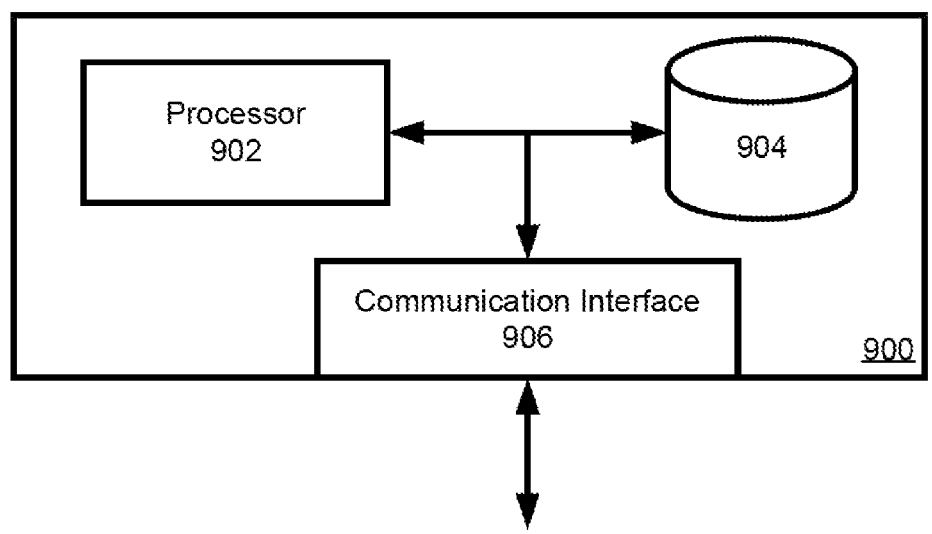
FIG. 9 is a block diagram illustrating an example network element.

FIG. 9 is a block diagram illustrating an example network node 900 according to embodiments of the present invention. Network node 900 can be any of the source nodes (sending host) and/or destination nodes (receiving host) as have been described herein. In some embodiments, network element 900 can be an Ethernet bridge or router. The network node 900 comprises circuitry including a processor 902, a memory or instruction repository 904 and a communication interface 906. The communication interface 906 can include at least one input port and at least one output port. The memory 904 contains instructions executable by the processor 902 whereby the network node 900 is operable to perform the various embodiments as described herein. In some embodiments, the network node 900 can be a virtualized application hosted by the underlying physical hardware. Network node 900 can be configured to implement the methods and procedures illustrated in FIGS. 1-8.

In some embodiments, network node 900 is operative to estimate congestion associated with a network path between a sending node and a receiving node. Network node 900 is configured to receive, via communication interface 906, a plurality of packets from a sending node and calculate, for each packet, a delay experienced by the packet between the sending node and receiving node. A minimum delay experienced by one (or more) of the packets in the plurality can be determined. The number of packets in the plurality that experienced a delay greater than the minimum delay can then be counted and used to determine a congestion factor for the network path. The congestion factor can, in turn, be used to determine a rate adjustment indicator which the network node 900 can transmit to the sending node.

Figure 10:
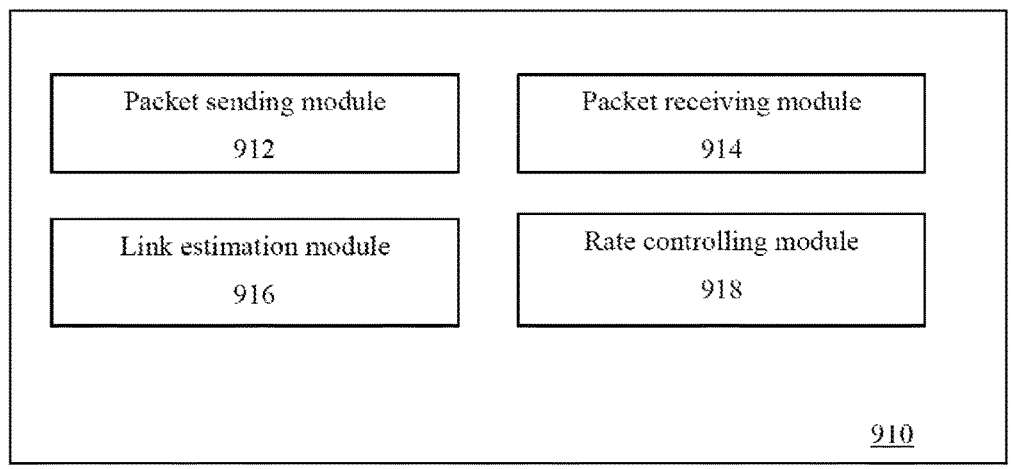
FIG. 10 is a block diagram of an example network node.

FIG. 10 is a block diagram of an example network node 910 configured to estimate and control congestion associated with a link between a sending node and a receiving node. The node 910 can include a packet sending module 912, a packet receiving module 914, a link estimation module 916, and a rate controlling module 918.

The node 910 can be configured to implement the methods and procedures illustrated in FIGS. 1-8. Packet sending module 912 can be configured to send a plurality of packets. Packet receiving module 914 can be configured to receive a plurality of packets. Link estimation module 916 can be configured to determining a number of packets in the plurality that have experienced greater than a minimum delay experienced by one of the packets in the plurality. Link estimation module 916 can be configured to determine a current congestion factor associated with the link in accordance with the number of packets that experienced delay greater than the minimum delay. A rate adjustment indicator can be further determined in accordance with the current congestion factor. Rate controlling module 918 can be configured to adjust a sending rate of the packet sending module 912 in accordance with the rate adjustment indicator.

Embodiments of the invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for estimating congestion associated with a network path between a sending node and a receiving node, the method performed by the receiving node, the method comprising:
   receiving a plurality of packets from the sending node;
   calculating, for each packet in the plurality, a delay experienced by the packet in accordance with a sending time of the packet and a reception time of the packet;
   determining a minimum delay experienced by at least one packet in the plurality;
   counting a number of packets in the plurality that experienced a delay greater than the minimum delay;
   determining a current congestion factor associated with the network path in accordance with the number of packets that experienced delay greater than the minimum delay;
   determining a rate adjustment indicator based at least in part on the current congestion factor; and
   sending the rate adjustment indicator to the sending node.

2. The method of claim 1, wherein each of the plurality of packets includes an indication of the sending time of the packet.

3. The method of claim 1, further comprising, recording the reception time for each of the plurality of packets.

4. The method of claim 1, wherein the plurality of packets are data packets.

5. The method of claim 1, wherein the plurality of packets are probe packets.

6. The method of claim 1, wherein the delay experienced by the packet is calculated further in accordance with a size of the packet.

7. The method of claim 1, wherein a packet that experienced the minimum delay has experienced no queueing delay.

8. The method of claim 1, wherein a packet that experienced delay greater than the minimum delay has experienced queueing delay.

9. The method of claim 1, wherein the current congestion factor indicates how close utilization of the network path is to full utilization.

10. The method of claim 1, wherein the rate adjustment indicator is determined at least in part based on a previously determined congestion factor.

11. The method of claim 1, wherein the rate adjustment indicator indicates a congestion trend relative to a previously determined congestion factor.

12. The method of claim 1, wherein the rate adjustment indicator is sent to the sending node to control a transmission rate of the sending node.

13. A network node comprising circuitry including a processor and a memory, the memory containing instructions that when executed by the processor cause the network node to implement the following steps:
   receive a plurality of packets from a sending node;
   calculate, for each packet in the plurality, a delay experienced by the packet in accordance with a sending time of the packet and a reception time of the packet;
   determine a minimum delay experienced by at least one packet in the plurality;
   count a number of packets in the plurality that experienced a delay greater than the minimum delay;
   determine a current congestion factor associated with a network path in accordance with the number of packets that experienced delay greater than the minimum delay;
   determine a rate adjustment indicator based at least in part on the current congestion factor; and
   send the rate adjustment indicator to the sending node.

14. The network node of claim 13, wherein each of the plurality of packets includes an indication of the sending time of the packet.

15. The network node of claim 13, further operative to record the reception time for each of the plurality of packets.

16. The network node of claim 13, wherein the plurality of packets are data packets.

17. The network node of claim 13, wherein the plurality of packets are probe packets.

18. The network node of claim 13, wherein the delay experienced by the packet is calculated further in accordance with a size of the packet.

19. The network node of claim 13, wherein a packet that experienced the minimum delay has experienced no queueing delay.

20. The network node of claim 13, wherein a packet that experienced delay greater than the minimum delay has experienced queueing delay.

21. The network node of claim 13, wherein the current congestion factor indicates how close utilization of the network path is to full utilization.

22. The network node of claim 13, wherein the rate adjustment indicator is determined at least in part based on a previously determined congestion factor.

23. The network node of claim 13, wherein the rate adjustment indicator indicates a congestion trend relative to a previously determined congestion factor.

24. The network node of claim 13, wherein the rate adjustment indicator is sent to the sending node to control a transmission rate of the sending node.

25. A computer readable storage medium storing executable instructions, which when executed by a processor, cause the processor to:
   receive a plurality of packets from a sending node;
   calculate, for each packet in the plurality, a delay experienced by the packet in accordance with a sending time of the packet and a reception time of the packet;
   determine a minimum delay experienced by at least one packet in the plurality;
   count a number of packets in the plurality that experienced a delay greater than the minimum delay;
   determine a current congestion factor associated with a network path in accordance with the number of packets that experienced delay greater than the minimum delay;
   determine a rate adjustment indicator based at least in part on the current congestion factor; and
   send the rate adjustment indicator to the sending node.

* * * * *